United States Patent
Zimmerman et al.

(10) Patent No.: US 10,653,072 B2
(45) Date of Patent: May 19, 2020

(54) TABLETOP WREATH ASSEMBLY APPARATUS

(71) Applicant: MMP of Merrill, Inc., Merrill, WI (US)

(72) Inventors: Timothy Zimmerman, Schofield, WI (US); Jeffrey Allen Schellhorn, Merrill, WI (US)

(73) Assignee: MMP of Merrill, Inc., Merrill, WI (US)

( * ) Notice: Subject to any disclaimer, the term of this patent is extended or adjusted under 35 U.S.C. 154(b) by 711 days.

(21) Appl. No.: 15/206,367

(22) Filed: Jul. 11, 2016

(65) Prior Publication Data

US 2017/0020081 A1    Jan. 26, 2017

Related U.S. Application Data

(60) Provisional application No. 62/194,520, filed on Jul. 20, 2015.

(51) Int. Cl.
*A01G 5/02* (2006.01)
*B25B 27/14* (2006.01)
*B65B 13/34* (2006.01)

(52) U.S. Cl.
CPC ............. *A01G 5/02* (2013.01); *B25B 27/146* (2013.01); *B65B 13/345* (2013.01)

(58) Field of Classification Search
CPC ....... B25B 25/00; B25B 27/146; B65B 1/025; B65B 13/04; B65B 13/10; B65B 13/14; B65B 13/30; B65B 13/305; B65B 13/345; B65B 13/025; B65B 13/34; A01G 5/02; A01G 17/08; A01G 17/085; Y10T 29/53783

See application file for complete search history.

(56) References Cited

U.S. PATENT DOCUMENTS

| | | | | |
|---|---|---|---|---|
| 823,556 | A | * 6/1906 | Smith | .............. B21F 15/04 140/101 |
| 1,776,868 | A | 9/1930 | Stratton | |
| 2,124,991 | A | 7/1938 | Watt et al. | |
| 2,442,679 | A | 6/1948 | Embree et al. | |
| 3,069,686 | A | * 12/1962 | Smith | .............. B25B 7/02 72/409.01 |
| 3,593,759 | A | * 7/1971 | Wooge | .......... A01G 17/085 140/118 |
| 4,802,271 | A | * 2/1989 | Bader | ............ A01G 5/02 29/243.56 |
| 5,020,202 | A | * 6/1991 | Turrell | .............. B25B 31/00 29/243.56 |
| 5,035,040 | A | * 7/1991 | Kerrigan | ............ B21F 45/24 140/82 |

(Continued)

*Primary Examiner* — Edward T Tolan
(74) *Attorney, Agent, or Firm* — Andrus Intellectual Property Law, LLP

(57) ABSTRACT

A wreath assembly apparatus for securing wreath materials to a wreath ring frame having a plurality of clips includes a base, a pair of jaws operably coupled to each other and the base, and a pair of gears, including a drive gear and an idler gear. The jaws and gears are operably connected such that rotation of lower ends of the jaws causes upper ends of the jaws to move toward each other to bend a clip. The lower ends of each jaw in the pair of jaws lie in a first plane, and the upper end of one of the jaws in the pair of jaws lies outside the first plane.

3 Claims, 7 Drawing Sheets

(56) References Cited

U.S. PATENT DOCUMENTS

| | | | |
|---|---|---|---|
| 5,247,729 A | 9/1993 | Carmichael | |
| 5,255,421 A * | 10/1993 | Kamysiak | A01G 5/02 |
| | | | 29/243.56 |
| 5,829,490 A * | 11/1998 | Kilbane | A01G 5/02 |
| | | | 140/71 R |
| 5,896,638 A | 4/1999 | Kamysiak | |
| 6,152,188 A * | 11/2000 | Barlasov | B65B 13/345 |
| | | | 140/153 |
| 6,233,804 B1 * | 5/2001 | Fourdraine | B21D 39/025 |
| | | | 29/243.56 |
| 9,387,573 B2 * | 7/2016 | Pearson | B25B 7/20 |
| 2010/0236061 A1 * | 9/2010 | Mobley | B25B 27/146 |
| | | | 29/816 |
| 2011/0277530 A1 * | 11/2011 | Haase | B25B 27/146 |
| | | | 72/409.13 |
| 2018/0040998 A1 * | 2/2018 | Frenken | B25B 7/12 |

* cited by examiner

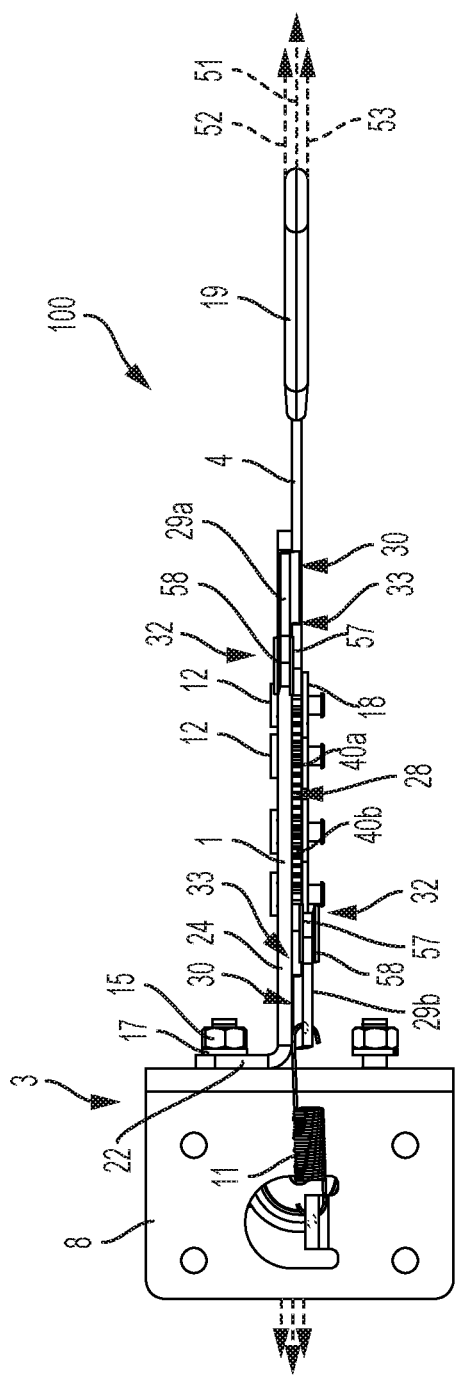
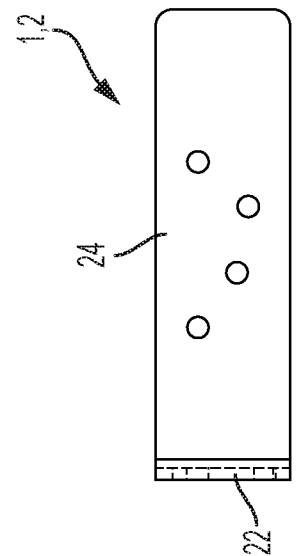
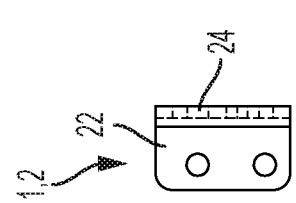
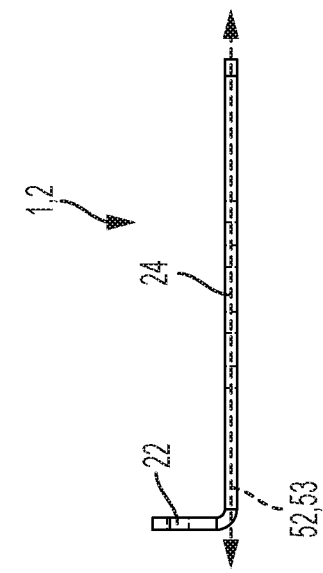
FIG. 4
FIG. 5A
FIG. 5B
FIG. 5C

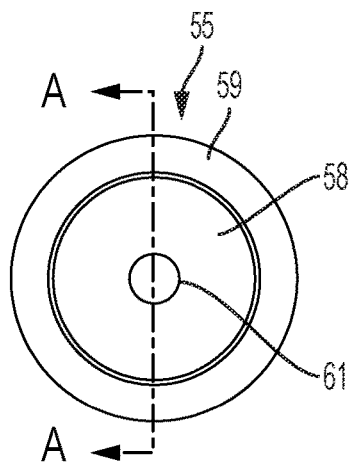
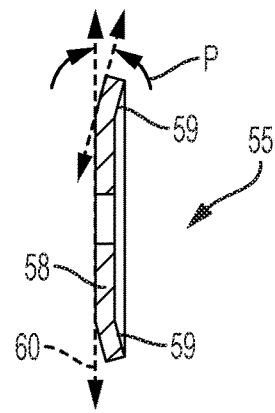
FIG. 7A   FIG. 7B
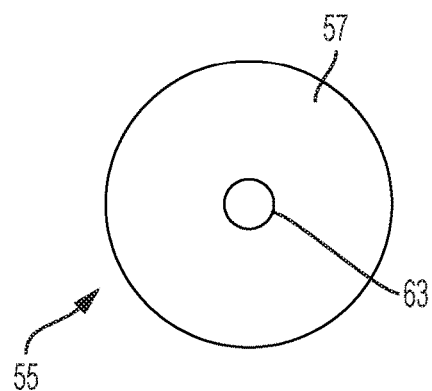
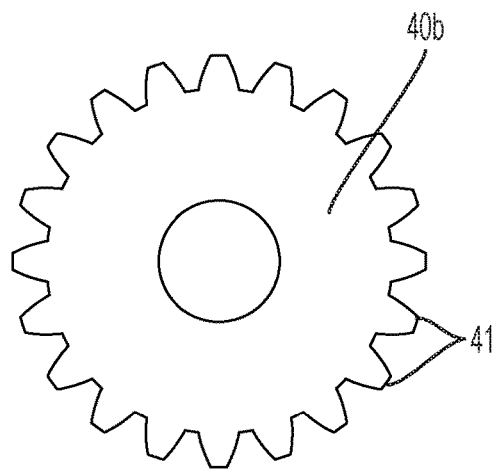
FIG. 8   FIG. 9
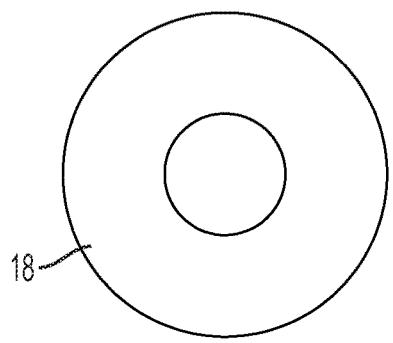
FIG. 10

TABLETOP WREATH ASSEMBLY APPARATUS

CROSS REFERENCE TO RELATED APPLICATION

The present application claims the benefit of U.S. Provisional Application Ser. No. 62/194,520, filed Jul. 20, 2015, which is hereby incorporated by reference herein.

FIELD

The present disclosure relates to the field of craft making apparatuses, and more specifically to apparatuses that can be used to make wreaths by bending wire and/or wire clips attached to a wreath ring frame around decorative items.

BACKGROUND

U.S. Pat. No. 1,776,868 discloses a wire strapping tool designed for tensioning and fastening wire straps or the like around packages. It has for an object to provide such a device that embodies various improvements in the form, construction, and arrangement of the several parts, whereby its designed function is more rapidly and efficiently performed than with previous devices of this nature, and whereby strength, rigidity, and durability are attained to a high degree.

U.S. Pat. No. 2,124,991 discloses a wire strapping tool designed for tensioning and fastening wire straps or the like around packages. It is particularly adapted for use with straps in which one end is coiled back on the body of the strap and the knot or gripping formation is made by inserting the other end of the strap through the said coiled portion and then crushing or flattening the coiled portion so as to deform the contacting parts into an interlocking engagement.

U.S. Pat. No. 2,442,679 discloses a wire strapping tool designed for tensioning and fastening around packages straps composed of wire or the like. The tool is particularly intended to be used in combination and cooperation with a wire strap, which has been formed with one end of the wire turned back and coiled around the body of the wire, so that the knot or fastening may be made by passing the other end of the wire strap through the said coil and then crushing or flattening the coil so as to deform it and the parts of the wire strap there within into a firm interlocking engagement. Simultaneously with this knotting of the strap, the excess of its free end is severed, to improve the appearance of the result, and to eliminate the long end, which might present a hazard in subsequent handling and shipment.

U.S. Pat. No. 5,247,729 discloses an apparatus for manufacturing a wreath from a plurality of elongated objects, such as boughs, by securing the boughs to a frame with a securing member such as a wire.

U.S. Pat. No. 5,896,638 discloses a system comprising a clamping machine and a wire frame operand for making all types of decorations. The wire frame with plurality of U shaped clips can be in such shapes as wreath circle, heart, swag, candy cane and the like. The machine comprises a handle, a pair of jaw members, one in the shape of a C and another in the shape of an F, a spring, and a means for anchoring said machine to a convenient working surface. A decoration is made by aligning each U clip of the frame between said pair of jaws and then placing some greens or other decorative twigs with stem along the rigid wire of the frame and then pulling the handle which closes the U clip by cam action of said pair of jaws.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure relates to a wreath assembly apparatus for securing wreath materials to a wreath ring frame having a plurality of clips. The wreath assembly apparatus includes a base and a pair of jaws operably coupled to each other and the base. Each jaw in the pair of jaws has an upper end and a lower end opposite the upper end, and the pair of jaws is configured to bend one of the plurality of clips. The lower ends of each jaw in the pair of jaws lie in a first plane, and the upper end of one of the jaws in the pair of jaws lies outside the first plane.

In some examples, a wreath assembly apparatus for securing wreath materials to a wreath ring frame having a plurality of clips includes: a base; a first gear coupled to the base; a second gear coupled to the base and engaged with the first gear; a first jaw coupled to the base and having an upper end configured to engage a first end of one of the plurality of clips and a lower end engaged with the first gear; and a second jaw coupled to the base and having an upper end configured to engage a second end of the one of the plurality of clips and a lower end engaged with the second gear. The first gear and the second gear rotate relative to each other such that the first gear rotates in a first direction and the second gear rotates in a second direction opposite the first direction, and the upper ends of the first and second jaws move toward each other as the first gear rotates in the first direction and the second gear rotates in the second direction so as to bend the first and second ends of the one of the plurality of clips toward each other.

BRIEF DESCRIPTION OF THE DRAWINGS

Examples of the present disclosure are described with reference to the following figures. The same numbers are used throughout the figures to reference like features and like components.

FIG. 4 illustrates a top view of the wreath assembly apparatus with one bracket removed.

FIG. 5A is a top view of an example bracket of the wreath assembly apparatus.

FIG. 5B is an end view of the example bracket of FIG. 5A.

FIG. 5C is a side view of the example bracket of FIGS. 5A and 5B.

FIG. 7A illustrates an example outside jaw cover of the wreath assembly apparatus.

FIG. 7B illustrates a cross-sectional view of the outside jaw cover of FIG. 7A along line A-A.

FIG. 8 illustrates an example inside jaw cover of the wreath assembly apparatus.

FIG. 9 illustrates an example gear of the wreath assembly apparatus.

FIG. 10 illustrates an example spacer of the wreath assembly apparatus.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. For example, any of the rivets, bolts/nuts, or screws described herein below can be replaced with other types of fasteners known to those having ordinary skill in the art. The noted fasteners could also be replaced with welded or integral connections where relative movement is not required between parts.

Figure 11:
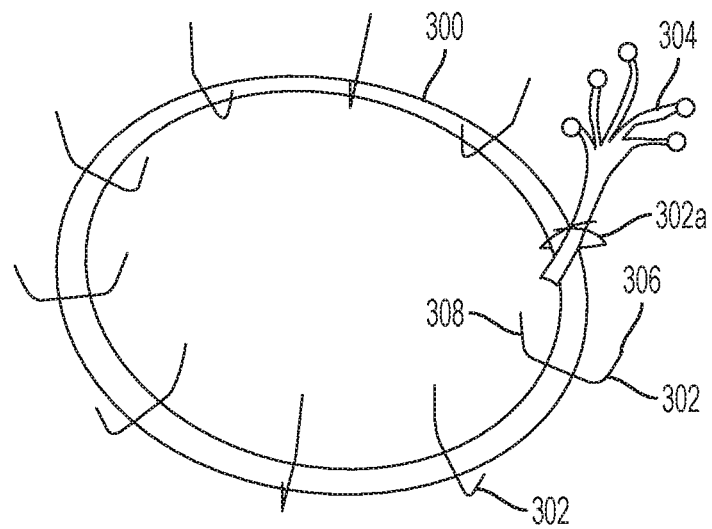
FIG. 11 illustrates an example wreath ring frame for use with the apparatus of the present disclosure.

The present inventors have developed a wreath assembly apparatus that quickly and easily allows an operator to create a decorative wreath. At-home crafting has become increasingly popular in recent years, and many people create unique and hand-made decorative wreaths for different events (e.g. The Fourth of July, Christmas, birthdays) using decorative items (e.g. tree branches, lights, grasses). Referring to FIG. 11, decorative items are secured to a wreath ring frame 300 by bending clips 302 around the decorative items. For example, see clip 302a bent around decorative item 304. The clips 302 may be pre-connected to the wreath ring frame 300, or the clips 302 may be added to the wreath ring frame 300. The apparatus of the present disclosure utilizes a gear driven system coupled to a handle that allows the operator to apply an even clamping force to both ends 306, 308 of one of the clips 302 at the same time to clamp them over a decorative item 304. Additionally, the present disclosure includes jaws and/or jaw covers that prevent the clip from 302 sliding out of place during operation of the apparatus, such that the operator can move his or her hands away from pinch points of the apparatus to prevent injury.

FIGS. 1A-4 depict a wreath assembly apparatus 100 according to the present disclosure. The apparatus 100 allows an operator to produce wreaths quickly and easily at home using clamp-style wreath ring frames (see, e.g., FIG. 11). Specifically, the operator (typically a consumer interested in crafts and hobbies) employs this apparatus 100 to mechanically aid in fastening or securing decorative wreath items 304 to a wreath ring frame 300 with a plurality of clips 302.

The apparatus 100 includes a base 3 having a first bracket 1 and a second bracket 2. The brackets 1, 2 are coupled to a table mount bracket 8 by way of a plurality of nuts 17, a plurality of bolts (not shown), and a plurality of washers 15. Each of the brackets 1, 2 has an "L"-shape having a long end 24 and a short end 22, which lies flush with the table mount bracket 8 for coupling thereto. (See also FIGS. 5A-5C, depicting top, end, and side views of the brackets 1, 2, respectively). Each long end 24 of the brackets 1, 2, includes holes that align with the holes of the opposite bracket 1, 2 to receive rivets 12 that couple the long ends 24 of the brackets 1, 2 to each other such that the short ends 22 of the brackets 1, 2 extend in opposite directions or are splayed outwardly from each other (see FIGS. 1A and 2). A gap 28 is defined between the first bracket 1 and the second bracket 2 such that the gap 28 lies in a first plane 51, the bracket 1 lies in a second plane 52, and the bracket 2 lies in a third plane 53 (see FIG. 4). The second plane 52 is offset from and parallel to the first plane 51, and the third plane 53 is parallel to the first plane 51 and offset from the first plane 51 in a direction opposite the second plane 52.

The table mount bracket 8 includes a gap 26 wherein the edge of a table or other support surface (not shown) can be placed. A screwed clamp shim 10 included with the table mount bracket 8 can then be spun by way of a lower end 20 to raise or lower the clamp shim 10 and hold the table mount bracket 8 tight on the edge of the table. The clamp shim 10 allows the apparatus 100 to be mounted to the table without permanent hardware such that when the operator is finished with the apparatus 100, the apparatus can be simply and easily removed from the table.

Figure 1A:
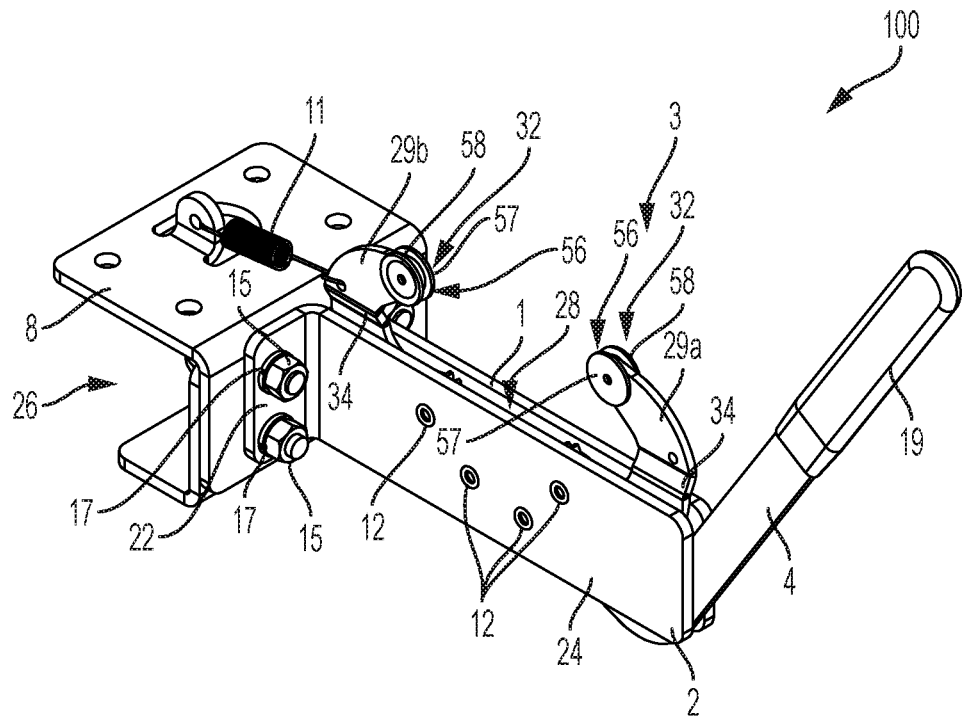
FIG. 1A illustrates a left perspective view of a wreath assembly apparatus according to the present disclosure.
Figure 1B:
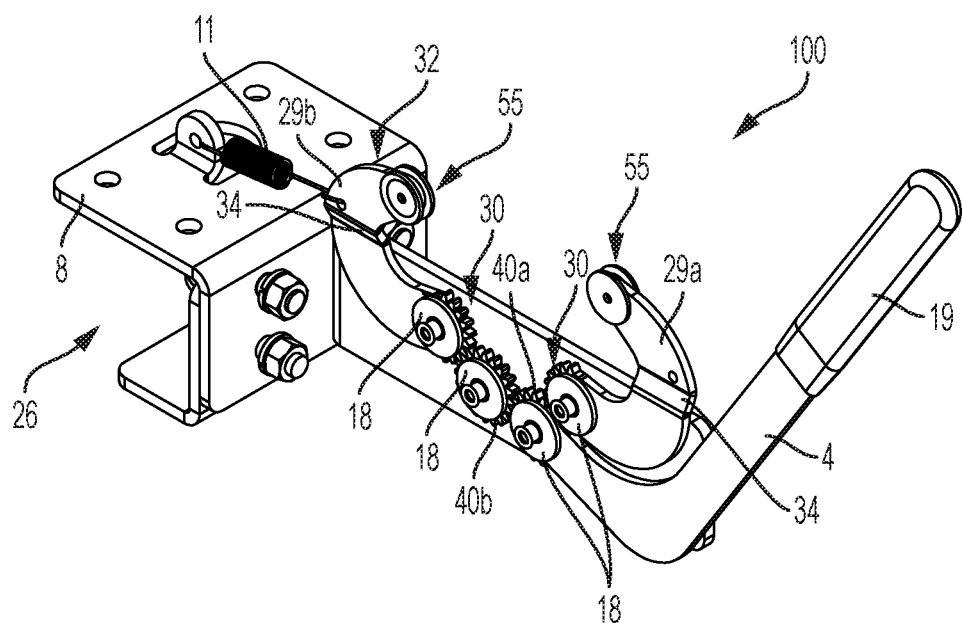
FIG. 1B illustrates the left perspective view of the wreath assembly apparatus, from which one bracket has been removed.
Figure 2:
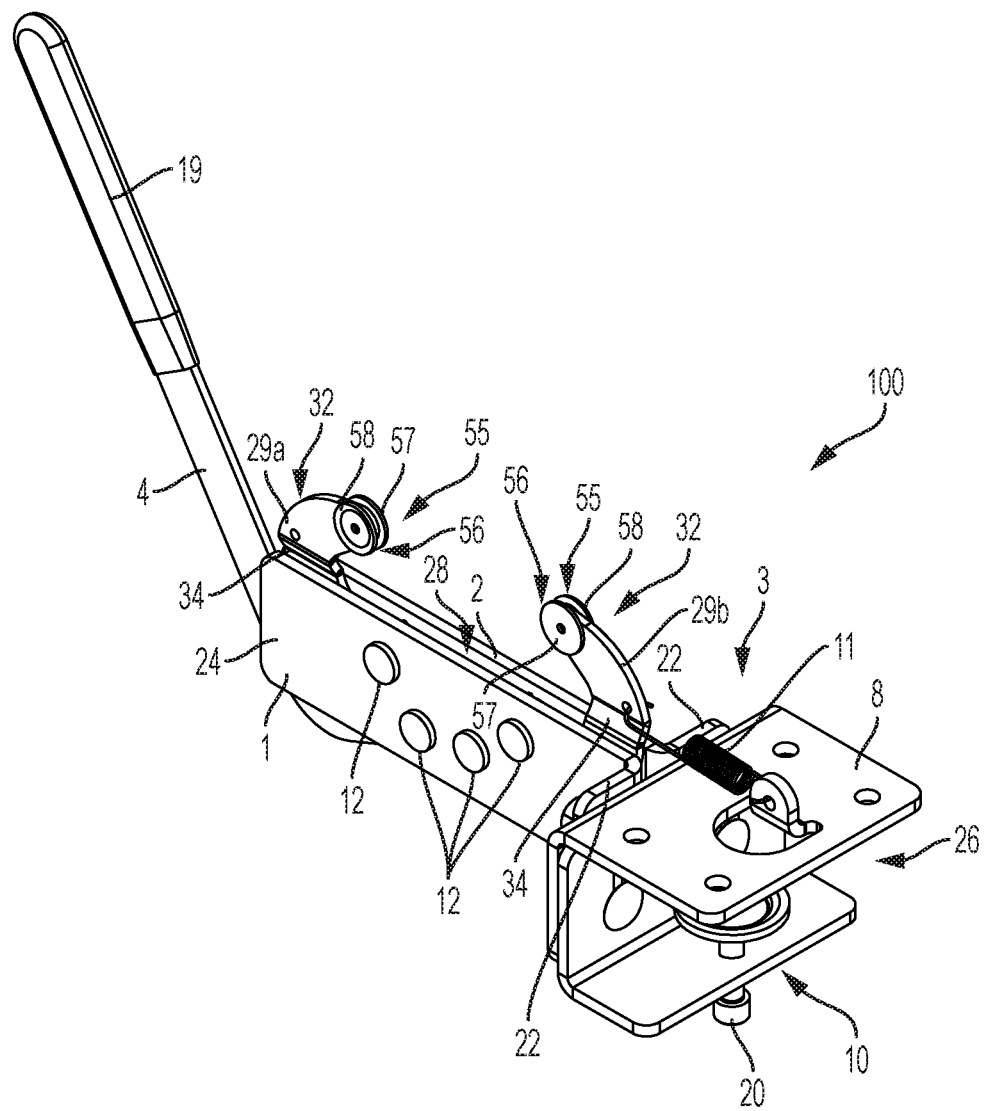
FIG. 2 illustrates a right perspective view of an opposite end of the wreath assembly apparatus illustrated in FIG. 1A.
Figure 3:
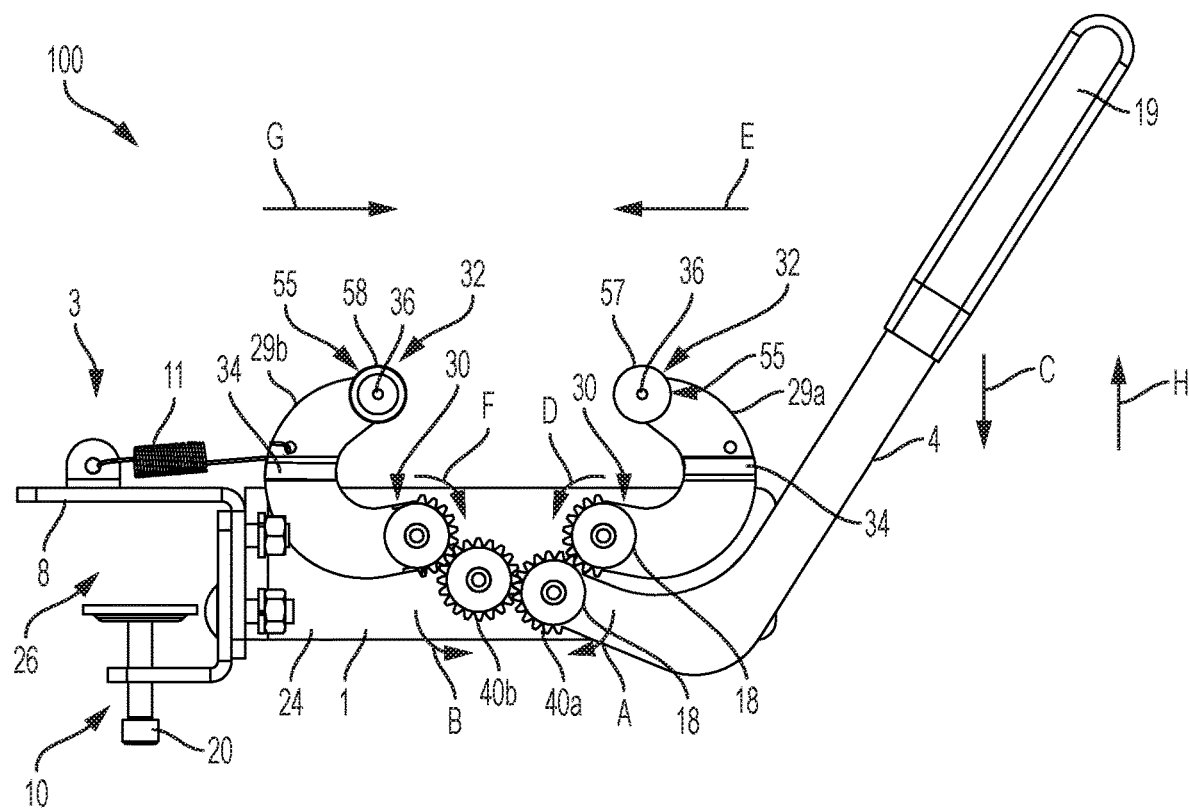
FIG. 3 illustrates a side view of the wreath assembly apparatus of FIG. 1B, i.e. with one bracket removed.
Figure 6A:
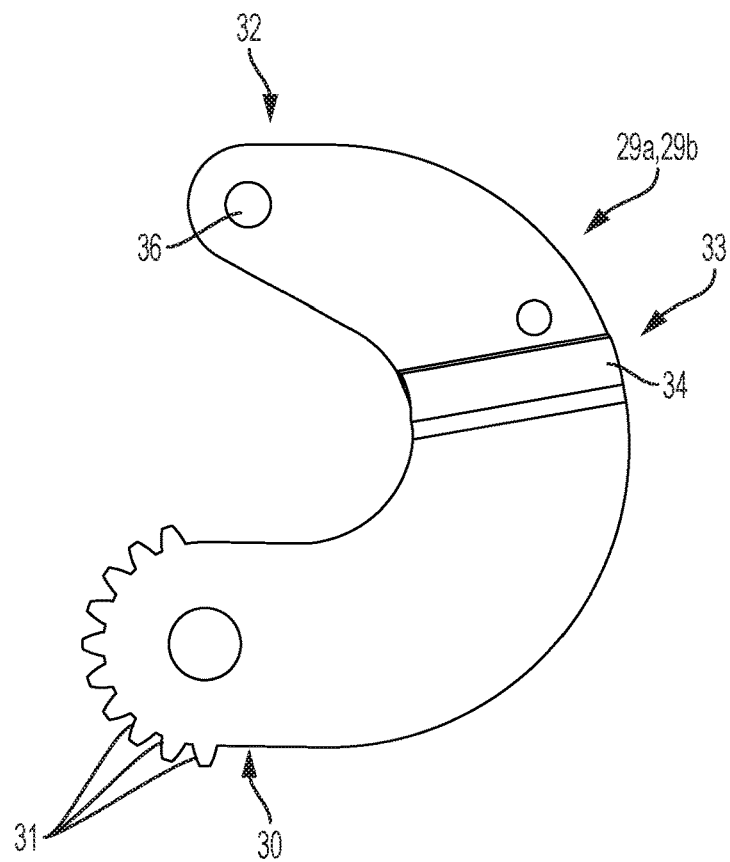
FIG. 6A illustrates a side view of an example jaw of the wreath assembly apparatus.
Figure 6B:
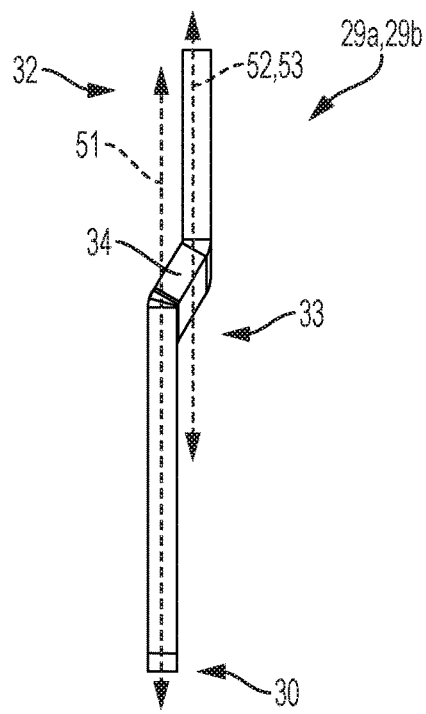
FIG. 6B illustrates an end view of the jaw of FIG. 6A.

The apparatus 100 includes a first jaw 29a and a second jaw 29b. The jaws 29a, 29b are operably coupled to the base 3 and are moveable with respect thereto, for example by way of rivets 12. Each jaw 29a, 29b includes a lower end 30 and an upper end 32 opposite the lower end 30. Referring also to FIGS. 6A and 6B, the lower ends 30 are semicircular and are provided with a number of geared teeth 31. Each jaw 29a, 29b curves in a "C" shape from the lower end 30 toward the upper end 32. The lower ends 30 of each jaw 29a, 29b are situated within the gap 28 between the brackets 1, 2 and lie in the first plane 51, while the upper ends 32 of each jaw 29a, 29b are situated outside of the gap 28 and lie outside the first plane 51 (see FIG. 4). The upper ends 32 are situated above the brackets 1, 2 and can lie, for example, in the second plane 52, the third plane 53, or any other plane. In the present example, the upper end 32 of the first jaw 29a lies in the second plane 52, and the upper end 32 of the second jaw 29b lies in the third plane 53. In other examples, one of the upper ends 32 lies in the first plane 51 and the other of the upper ends 32 lies a plane that is not the first plane 51. Note that the planes along which the upper ends 32 of the jaws 29a, 29b lie do not necessarily need to be the same planes as those along which the brackets 1, 2 lie, although this is the case in the example shown herein.

Note that each of the jaws 29a, 29b has the same shape, but one of the jaws is flipped backward with respect to the other of the jaws when the jaws 29a, 29b are installed on the base 3. Therefore, details of the first and second jaws 29a, 29b will be described herein below together. Referring to FIGS. 6A and 6B, each jaw 29a, 29b has a transition area 33 including a jog 34 that changes the planar orientation of the jaw 29a, 29b such that the upper end 32 lies in a different plane than the lower end 30, as described above. The transition area 33 of each jaw 29a, 29b ensures that the lower ends 30 of the jaws 29a, 29b can be smoothly operated in the first plane 51 in the gap 28 between the brackets 1, 2 (see FIGS. 1-4), while the upper ends 32 of the jaws 29a, 29b can be located in in different planes from one another. While the transition area 33 is shown herein as being integral with the lower end 30 and the upper end 32 of the jaws 29a, 29b, the lower and upper ends of the jaws could instead be separate pieces that are coupled alongside one another. It should also be understood that the jog 34 could take many other forms and shapes than that shown herein.

The height-wise location of the transition area 33 and jog 34 is slightly higher than the middle of the jaw 29a, 29b such that the transition areas 33 clear the height of the brackets 1, 2 when the jaws 29a, 29b are coupled between the brackets 1, 2. The jaws 29a, 29b will not interfere with each other so long as the jog 34 places the upper ends 32 of each jaw 29a, 29b in different planes, for example, such that at least one upper end 32 of one of the jaws 29a, 29b is in a plane that is offset from the gap 28. Further, orientating the upper ends 32 of the jaws 29a, 29b in different planes is beneficial when a clamping action is performed, as will be described herein below. However, it is not required that both jaws 29a, 29b have a jog 34, and one of the jaws 29a or 29b can instead be situated fully along the first plane 51. If one of the jaws is situated fully along a single plane, in order to prevent interference with the upper end 32 of the other of the jaws, the upper end 32 of the other jaw should not be in that same plane.

Referring to FIGS. 1A-4, 7A-7B, and 8, the upper end 32 of each jaw 29a, 29b includes a jaw cover 55 that is configured to engage with the one of the plurality of clips 302 of the wreath ring frame 300. The jaw covers 55 are attached to the upper ends 32 of the jaws 29a, 29b by way of respective rivets (not shown) that project through holes 36 at the upper ends 32 of the jaws 29a, 29b (see FIG. 6A) and holes 61, 63 in respective parts of the jaw covers 55. The jaw covers 55 are configured to prevent the ends of the clips 302 from disengaging from the pair of jaws 29a, 29b when the apparatus 100 is being operated, as described below.

Each jaw cover 55 includes an inside jaw cover 57 and an outside jaw cover 58 opposite the inside jaw cover 57, which together define a channel 56 that is configured to receive the one of the plurality of clips 302. A channel 56 lies between each inside jaw cover 57 and each outside jaw cover 58. The inside jaw covers 57 are situated on an opposite side of each jaw 29a, 29b from the outside jaw covers 58. The inside jaw covers 57 are situated more towards the first plane 51 than are the outside jaw covers 58. Thus, the inside jaw covers 57 on each jaw 29a, 29b are orientated toward each other such that the inside jaw cover 57 on the first jaw 29a is orientated toward the inside jaw cover 57 on the second jaw 29b. Each outside jaw cover 58 has an outer circumferential lip or perimeter edge 59. The perimeter edge 59 extends at an angle P defined with respect to a main plane 60 along which the outside jaw cover 58 lies (see FIG. 7B). The angle P of the perimeter edge 59 is on the face of the outside jaw cover 58 that faces into the channel 56 and therefore tends to cause a clip 302 to slide into the channel 56. The perimeter edge 59 thereby locates one end of a clip 302 within the channel 56 between the inside jaw cover 57 and the outside jaw cover 58 of one of the jaws 29a or 29b. Similarly, the other end of a clip 302 can be located in the channel 56 between the inside jaw cover 57 and the outside jaw cover 58 of the other of the jaws 29b or 29a. This allows the operator to move his or her hands away from the jaws 29a, 29b while still positively capturing the clip 302 in a fashion that is more effective than previous apparatuses.

Referring to FIGS. 1B, 3-4 and 9, the gears 40a, 40b are coupled to the base 3 and include a plurality of gear teeth 41. The second gear 40b engages with or is operably coupled to the first gear 40a such that the first gear 40a and the second 40b rotate relative to each other. For example, the first gear 40a rotates in a first direction (see movement arrow A in FIG. 3) and the second gear 40b rotates in a second direction (see movement arrow B in FIG. 3) that is opposite the first direction. The gears 40a, 40b can lie in the gap 28 between the brackets 1, 2 and/or in the first plane 51 (see FIG. 4).

Spacers 18 can be provided between the gears 40a, 40b and the brackets 1, 2 (see FIGS. 4 and 10). Although the counter-rotational movement of gears 40a, 40b is shown herein as being accomplished by way of intermeshing gear teeth 41, it should be understood that counter-rotation could be accomplished by way of engaged splined members, a high coefficient of friction between the parts, a pulley system, a never-ending chain, a sprocket, etc. In fact, any mechanism or system known for transferring rotational movement of one device to counter-rotational movement of another device could be used.

Referring to FIGS. 1A-4, the apparatus 100 includes an actuator, such as a handle 4, for rotating the first gear 40a in the first direction (arrow A). The first gear 40a is therefore a drive gear. The handle 4 includes a grip 19 and is generally "L"-shaped. The short end of the "L"-shaped handle 4 is coupled to the first gear 40a and can be fastened to, welded to, glued to, or integral with the first gear 40a. The handle 4 can be manually grasped by the operator, who can pivot the handle 4 to rotate the first gear 40a. As described above and referring specifically to FIG. 3, the first and second jaws 29a, 29b are operably coupled to each other via the first and second gears 40a, 40b. The lower end 30 of the first jaw 29a engages with the first gear 40a, and the lower end 30 of the second jaw 29b engages with the second gear 40b. According to the counter-rotating connections between the parts 29a, 29b, 40a, 40b, the upper ends 32 of the first and second jaws 29a, 29b move toward each other as the first gear 40a rotates in the first direction (arrow A) and the second gear 40b (which is an idler gear) simultaneously rotates in the second direction (arrow B).

The apparatus 100 also includes a spring 11 configured to bias the second jaw 29b away from the first jaw 29a. The spring 11 is coupled to the jaw 29b and the base 3, more specifically to a tab integral with the table mount bracket 8. The spring 11 is a tension spring; however, any type of spring can be used (e.g. a torsion spring). The spring 11 could also be coupled elsewhere to the base 3 other than at the table mount bracket 8. In another example, a torsion spring is instead provided at a lower end of the handle 4, which connects to an opposite side of first bracket 1 than do the gears 40a, 40b. The lower end of the handle 4 is connected to the gear 40a by way of a pivot pin extending through the first bracket 1. The torsion spring is designed such that when the handle 4 is pushed downwardly against the force of the spring, the gears 40a, 40b are rotated.

Figure 12:
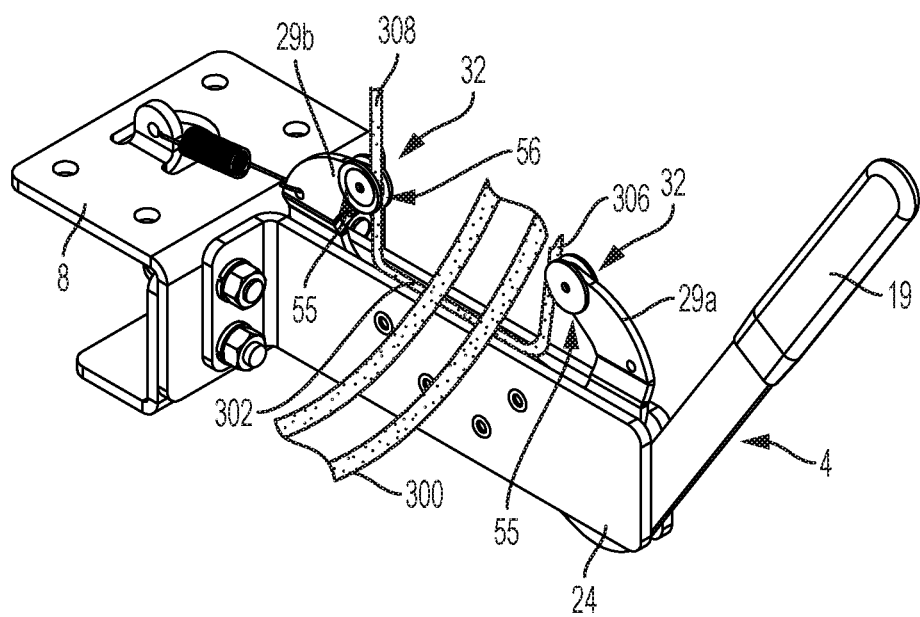
FIG. 12 illustrates a portion of the wreath ring frame in the apparatus of the present disclosure.

In operation, referring for example to FIG. 12, the jaws 29a, 29b are configured to bend one of the plurality of clips 302 to secure a decorative item 304 to the wreath ring frame 300. The upper end 32 of first jaw 29a is configured to engage a first end 306 of one of the plurality of clips 302 within the channel 56 of its jaw cover 55 Similarly, the upper end 32 of second jaw 29b is configured to engage a second end 308 of the one of the plurality of clips 302 within the channel 56 of its respective jaw cover 55. Now referring to FIG. 3, when the handle 4 is pushed downwardly (see movement arrow C of FIG. 3), the first gear 40a is rotated in the first direction (e.g. clockwise direction, arrow A), which causes the second gear 40b to rotate in the second direction (e.g. counterclockwise direction, arrow B) and causes the lower end 30 of the first jaw 29a to rotate in the second direction (e.g. counterclockwise direction, movement arrow D). This causes the upper end 32 of the first jaw 29a to rotate inwardly toward the middle of the apparatus 100 and towards the second jaw 29b (see movement arrow E). The second gear 40b rotates the lower end 30 of the second jaw 29b in the first direction (e.g. clockwise direction, movement arrow F) which tends to cause the upper end 32 of the second jaw 29b to move toward the center of the apparatus 100 and towards the first jaw 29a (see movement arrow G). As the first and second jaws 29a, 29b move simultaneously towards one another, the upper ends 32 are brought toward one another such that the first end 306 and the second end 308 of the clip 302 (engaged by the jaw covers 55 as described above with respect to FIG. 12) are bent inwardly toward each other to close around and secure the decorative item 304 to the wreath ring frame 300.

The jogs 34 of the first and second jaws 29a, 29b (described herein above) situate the upper ends 32 of the first and second jaws 29a, 29b in different planes from one another such that the upper ends 32 can be rotated almost fully alongside one another to clamp the first and second ends 306, 308 of the clip 302 tightly around the decorative item 304. After the first and second ends 306, 308 of the clip 302 are clamped tightly around the decorative item 304, the operator releases the handle 4 and the spring 11 biases the second jaw 29b away from the first jaw 29a, which causes the handle 4 to move upwardly (see movement arrow H). Therefore, because the geared teeth 31 on the lower end 30 of first jaw 29a engage with the first gear 40a and the geared teeth 31 on the lower end 30 of the second jaw 29b engage with the second gear 40b, the jaws 29a, 29b move toward or way from each other when the apparatus 100 is operated by the operator.

It should be noted that in the present example the movement of the handle 4 to provide the bending or clamping force is directed away from the wreath ring frame 300 and the first and second jaws 29a, 29b. This directed motion keeps the clamping action of the first and second jaws 29a, 29b free of interference, unlike other known wreath assembly apparatuses, such as those that utilize a stapling-type action, which crowds the wreath assembly area. The movement of the handle 4 away from the first and second jaws 29a, 29b (see movement arrow C, FIG. 3) keeps the operator's hand away from the clamping or closing action of the first and second jaws 29a, 29b rather than requiring the operator's hand to move toward the closing action of the first and second jaws 29a, 29b in order to close the clip 302.

The apparatus 100 offers a number of features not found on other wreath assembly apparatuses. The apparatus 100 operates via a gear-driven assembly, including first and second gears 40a, 40b that transfer movement directly from the handle 4 to the first and second jaws 29a, 29b. This creates a smooth and assured closing action upon which the wreath ring frame 300 is clamped. The gears 40a, 40b replace links and slides found on other wreath assembly machines. The gear drive system allows the entire apparatus 100 to be compactly manufactured using highly efficient metal stamping technology. The closing action or force that the jaws 29a, 29b and the gears 40a, 40b impart on the clip 302 is even, and therefore closes the clip 302 evenly at the same time. The result is smooth operation of the apparatus 100 without the need to maintain hand contact with the wreath ring frame 300 in an effort to prevent the clip 302 from sliding out of place during the closing action. The compact nature of this apparatus 100, combined with its highly efficient production using metal stamping technology, allows this product be built at a cost point favorable to hobbyists. This makes the apparatus 100 desirable to consumers who may wish to produce only one wreath for a specific event or holiday.

In the above description certain terms have been used for brevity, clarity, and understanding. No unnecessary limitations are to be inferred therefrom beyond the requirement of the prior art because such terms are used for descriptive purposes and are intended to be broadly construed. The different apparatuses described herein above may be used in alone or in combination with other apparatuses.

What is claimed is:

1. A wreath assembly apparatus for securing wreath materials to a wreath ring frame having a plurality of clips, the wreath assembly apparatus comprising:
    a base;
    a first jaw and a second jaw operably coupled to each other and the base, wherein the first jaw and the second jaw are configured to bend one of the plurality of clips;
    wherein the first jaw and the second jaw each have an upper end configured to engage the one of the plurality of clips and a lower end opposite the upper end;
    a first gear coupled to the lower end of the first jaw; and
    a second gear coupled to the lower end of the second jaw;
    wherein the first and second gears are operatively coupled to one another such that rotation of the first gear in a first direction causes the second gear to rotate in a second direction and the upper end of the first jaw and the upper end of the second jaw to move toward each other to thereby bend the one of the plurality of clips;
    wherein the lower end of the first jaw and the lower end of the second jaw lie in a first plane; wherein the upper end of the first jaw lies in a second plane that is offset from and parallel to the first plane; and
    wherein the upper end of the second jaw lies in a third plane that is parallel to the first plane and offset from the first plane in a direction opposite the second plane.

2. A wreath assembly apparatus for securing wreath materials to a wreath ring frame having a plurality of clips, the wreath assembly apparatus comprising:
    a base;
    a first jaw and a second jaw operably coupled to each other and the base, wherein the first and second jaws are configured to bend one of the plurality of clips, wherein the first jaw has a lower end that lies in a first plane and an opposite upper end that lies in a second plane offset from and parallel to the first plane, and wherein the second jaw has a lower end that lies in the first plane and an opposite upper end that lies in a third plane offset from and parallel to the first plane in a direction opposite the second plane;
    a first gear coupled to the lower end of the first jaw; and
    a second gear coupled to the lower end of the second jaw;
    wherein the first and second gears are operatively coupled to one another such that rotation of the first gear in a first direction causes the second gear to rotate in a second direction opposite the first direction such that the upper ends of the first and second jaws move toward each other to thereby bend one of the plurality of clips; and
    wherein the base has a first bracket that lies in the second plane and a second bracket that lies in the third plane.

3. The wreath assembly apparatus according to claim 2, wherein the first gear and the second gear are between the first bracket and the second bracket.

\* \* \* \* \*